US006584528B1

(12) United States Patent
Kurafuji et al.

(10) Patent No.: US 6,584,528 B1
(45) Date of Patent: Jun. 24, 2003

(54) MICROPROCESSOR ALLOCATING NO WAIT STORAGE OF VARIABLE CAPACITY TO PLURALITY OF RESOURCES, AND MEMORY DEVICE THEREFOR

(75) Inventors: Takashi Kurafuji, Hyogo (JP); Akira Yamada, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/488,784

(22) Filed: Jan. 21, 2000

(30) Foreign Application Priority Data

Aug. 3, 1999 (JP) ............................................ 11-219846

(51) Int. Cl.[7] .......................... G06F 12/00; G06F 13/14; G06F 13/38
(52) U.S. Cl. ........................ 710/240; 710/220; 710/314; 710/51; 710/260; 710/107; 370/351; 370/366; 370/386; 370/387; 370/388
(58) Field of Search .......................... 710/314, 51, 260, 710/107, 220, 240; 370/351, 366, 386, 387, 388

(56) References Cited

U.S. PATENT DOCUMENTS 5,325,503 A * 6/1994 Stevens et al. ............. 711/146
5,388,263 A * 2/1995 Ellis et al. .................. 711/146
6,189,093 B1 * 2/2001 Ekner et al. ................ 710/260
6,321,284 B1 * 11/2001 Shinohara et al. .......... 710/107
6,334,175 B1 * 12/2001 Chih .......................... 710/51

FOREIGN PATENT DOCUMENTS

| JP | 63-170755 | 7/1988 |
|----|-----------|--------|
| JP | 1-114950  | 5/1989 |
| JP | 7-114497  | 5/1995 |
| JP | 7-200523  | 8/1995 |

* cited by examiner

Primary Examiner—Gopal C. Ray
Assistant Examiner—Justin King
(74) Attorney, Agent, or Firm—McDermott, Will & Emery (57) ABSTRACT

A microprocessor includes a first bus and a second bus capable of operating simultaneously, a single port memory divided into a plurality of banks, a bus switch circuit provided between the plurality of banks and the first and second buses, and a processor core connected to the first and second buses and the single port memory. The bus switch circuit may be controlled statically, independent of activities on the buses, or may be controlled dynamically according to the activities.

7 Claims, 9 Drawing Sheets

MICROPROCESSOR ALLOCATING NO WAIT STORAGE OF VARIABLE CAPACITY TO PLURALITY OF RESOURCES, AND MEMORY DEVICE THEREFOR

BACKGROUND OF THE INVENTION

1. Field of the Invention

The present invention relates to microprocessors in which a plurality of resources use memories and memory devices therefor, and more specifically, to a microprocessor in which a plurality of resources share a single memory, and which permits no wait accesses in parallel.

2. Description of the Background Art

A microprocessor has a plurality of resources that access an internal memory, the resources including a data access control unit and a command fetch control unit. It is desired that these resources operate in parallel with one another, and thus, it is desirable that these resources are allowed to access the internal memory in parallel and with no wait.

Conventionally, such no wait access has been enabled by providing a memory dedicated for each internal resource. For example, a conventional microprocessor with Harvard architecture has a memory dedicated for data and a memory dedicated for commands, and these memories are allocated to the data access control unit and the command fetch control unit via a bus dedicated for data and a bus dedicated for commands, respectively. Thus, it is possible to perform command fetch and data access in parallel with no need of arbitration, which improves throughput of pipelined execution of instructions within a processor.

In such a conventional microprocessor, however, memory capacity dedicated for a corresponding resource is fixed. Therefore, different chips made of combinations of different memory capacities have been required for specific microprocessors with specific memory capacities required by specific applications.

SUMMARY OF THE INVENTION

An object of the present invention is to provide a microprocessor which allows a plurality of resources to access a memory in parallel with no wait, and which is readily reconfigurable in accordance with a change in memory capacity, and a memory device therefor.

Another object of the present invention is to provide a microprocessor which allows a plurality of resources to access a shared memory in parallel with no wait, and which is readily reconfigurable in accordance with a change in memory capacity allocated to respective resources, and a memory device therefor.

A still another object of the present invention is to provide a microprocessor which allows a plurality of resources to access a memory in parallel with no wait, which is readily reconfigurable in accordance with a change in memory capacity, and which also is able to handle an illegal access to the memory without excessively increasing the amount of hardware, and a memory device therefor.

A further object of the present invention is to provide a microprocessor which allows a plurality of resources to access a shared memory in parallel with no wait, which is readily reconfigurable in accordance with a change in memory capacity allocated to respective resources, and which also is able to arbitrate memory access contention without excessively increasing the amount of hardware, and a memory device therefor.

A microprocessor according to the present invention includes: a first bus and a second bus capable of operating simultaneously; a single port memory divided into a plurality of banks; a bus switch circuit provided between the plurality of banks and the first and second buses; and a processor core connected to the first and second buses and the single port memory.

Each of the plurality of banks can be selectively coupled to the first and the second buses by the bus switch circuit. The banks can separately be allocated to the plurality of resources coupled to the first and second buses. Simply changing the number of banks to be allocated will alter the memory capacity allocated to each resource.

Preferably, the bus switch circuit includes a plurality of bus switches each provided between corresponding one of the plurality of banks and the first and second buses, and controlled by bus designating information given to the corresponding bank.

The bus switches can be controlled independent of activities on the first and second buses, by providing the bus switching circuit with the bus designating information. The bus designating information may be provided directly to the bus switch via an external pin, or may be written into a storage element temporarily and then provided via this storage element to the bus switch.

Each bank of the memory can be allocated to a resource independent of the activities on the buses. Therefore, when memory capacity to be allocated to each resource is known, it is possible to configure the microprocessor optimally in advance.

Each of the plurality of bus switches may further include an exception generating portion which detects occurrence of an access to a corresponding bank on a bus that is other than the bus coupled to the corresponding bank, generates an exception, and applies it to the processor core. If a resource generates an access to a bank that is not originally allocated thereto, the access must be handled as an illegal access. According to the present invention, the exception can be generated when such an access is detected, and is supplied to the processor core. Thus, it is possible to handle the illegal access by a program performed on the processor core, without having to add special hardware.

Each of the plurality of bus switches may include a selector circuit for dynamically selecting either the first bus or the second bus based on the activities thereon, to couple an input/output path of a corresponding bank to the selected bus.

This enables dynamic allocation of banks to respective resources based on the activities on the first and second buses, instead of allocating the banks to the resources in advance. Thus, it is possible to determine memory capacity to be allocated to each resource, not in a unit of a bank, but in a unit that is smaller than the bank.

The selector circuit may include an access request detecting portion that detects an access request on either the first bus or the second bus, and couples the bus with the access request to the input/output path of the corresponding bank. A bus is coupled to a designated bank only when an access request to the bank is actually generated on the bus. Thus, it is possible to flexibly reconfigure the microprocessor for applications in which banks cannot be allocated in advance.

The selector circuit may further include a simultaneous access detecting portion that detects occurrence of simultaneous access requests to a same bank on the first bus and the second bus, and generates an exception that will be applied to the processor core. When access requests to the same bank occur simultaneously, these contending requests must be arbitrated. In the microprocessor of the present invention, an exception is generated and supplied to the processor core. Thus, the access requests can be arbitrated by an exception handling program performed on the processor core. Therefore, it is possible to arbitrate access requests without having to add excessive hardware.

The memory device according to another aspect of the present invention is a memory device for use in a microprocessor having a processor core coupled to first and second buses, which includes a single port memory divided into a plurality of banks, and a bus switch circuit provided between the plurality of banks and the first and second buses.

The plurality of banks of the memory device can be selectively allocated to the first and second buses, and therefore, the respective banks can be allocated to resources connected to the first and second buses. The memory capacity to be allocated to each resource can readily be altered by changing the number of the banks to be allocated.

The method of operating the microprocessor according to a still another aspect of the present invention includes: the step of preparing bus designating information corresponding to the plurality of banks, and the step of operating a plurality of bus switches such that input/output paths of corresponding banks are selectively switched to the first bus or the second bus, according to the corresponding bus designating information.

The plurality of banks of the memory device can be selectively allocated to the first and second buses, respectively. The memory capacity to be allocated to each resource can readily be altered by changing the number of banks to be allocated.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
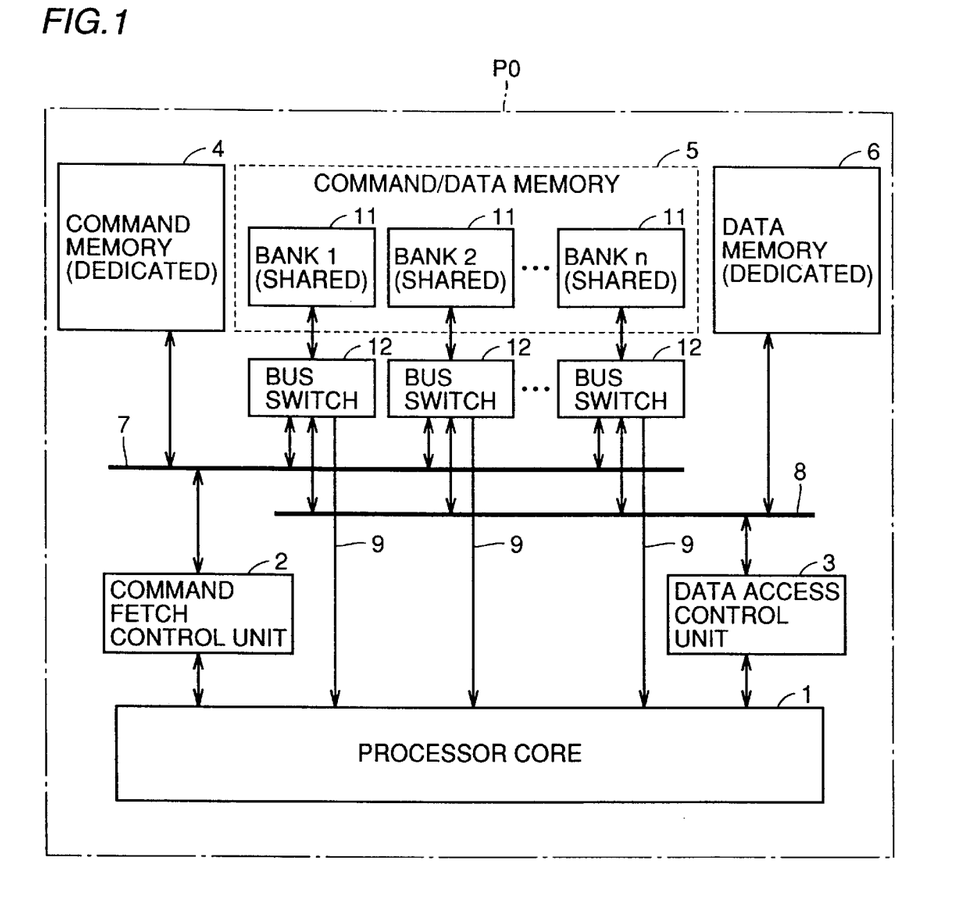
FIG. 1 is a block diagram of a microprocessor according to a first embodiment of the present invention.

Referring to FIG. 1, a microprocessor P0 according to the first embodiment of the present invention incorporates Harvard architecture having a command bus 7 and a data bus 8 dedicated for command fetch and data access, respectively. Here, command bus 7 consists of buses for commands, command addresses, and command output control signals. Data bus 8 consists of buses for data, data addresses, data output control signals and data write control signals.

In addition to command bus 7 and data bus 8, processor P0 further includes: a processor core 1; a command fetch control unit 2 provided between processor core 1 and command bus 7; a data access control unit 3 provided between processor core 1 and data bus 8; a memory dedicated for command (hereinafter, referred to as "command memory") 4 connected to command bus 7; a memory dedicated for data (hereinafter, "data memory") 6 connected to data bus 8; a memory shared by command and data (hereinafter, "command/data memory") 5 having a plurality of banks 11 selectively coupled to command bus 7 or data bus 8 according to a mechanism which will be described later; and bus switches 12 provided corresponding to banks 11 (bank 1, bank 2, . . . bank n) of command/data memory 5 for selectively coupling these banks to command bus 7 or data bus 8, and for outputting an exception signal 9 to processor core 1 when detecting an access to a corresponding bank from a resource that is not allocated to the corresponding bank. The "bank" refers to a unit in a memory that can be accessed independent of each other. Data reading and writing at a bank and data reading and writing at another bank can be performed in parallel.

Command memory 4 is a memory of a fixed capacity that is exclusively used for storing command. Likewise, data memory 6 is a memory having a fixed capacity that is exclusively used for storing data. Though command/data memory 5 is a memory of a fixed capacity as a whole, each of the n banks 11 can be coupled selectively to command bus 7 or data bus 8 by bus switch 12.

Figure 2:
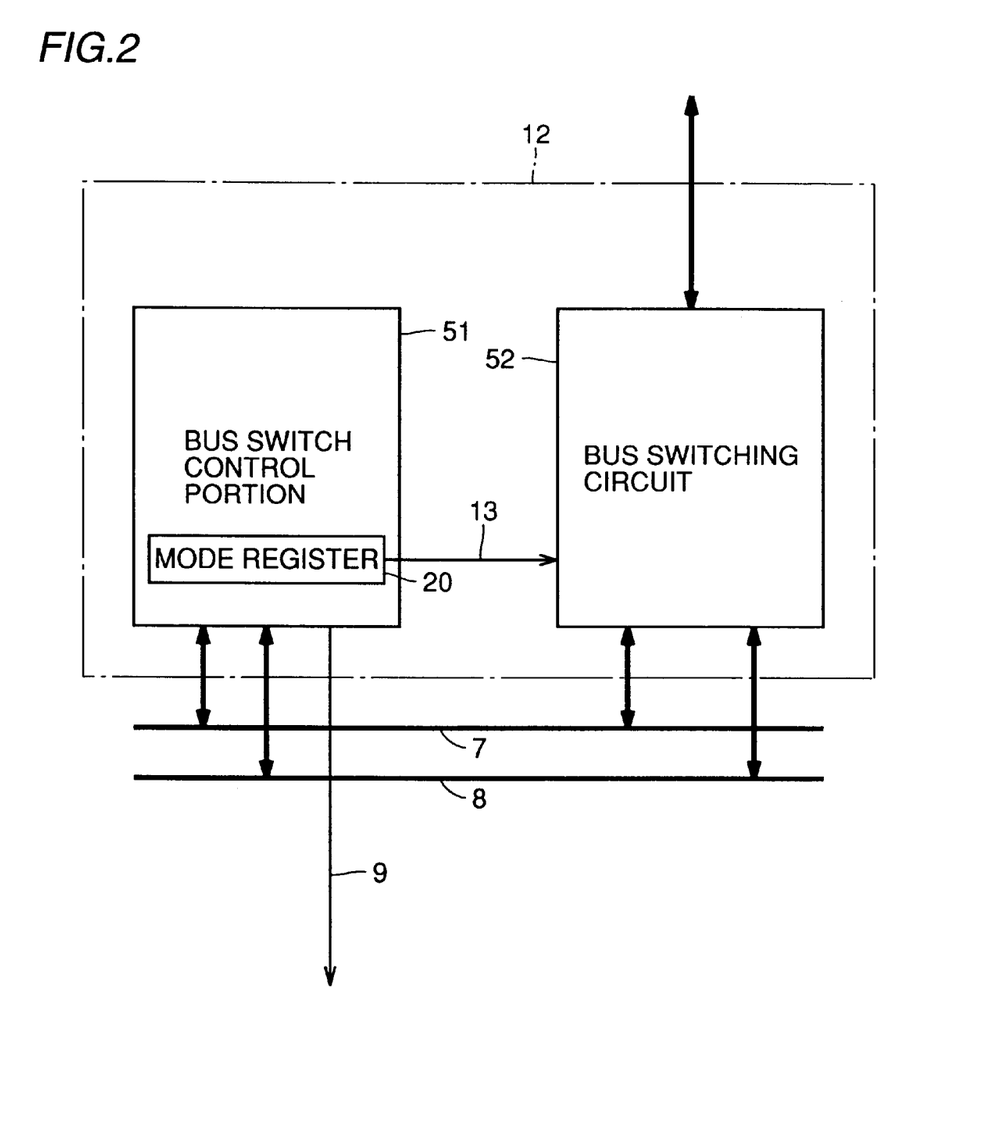
FIG. 2 is a block diagram of a bus switch.

Referring to FIG. 2, bus switch 12 includes: a bus switch control portion 51 that outputs a mode signal 13 for determining to which bus a corresponding memory bank 11 is to be coupled, and also generates the above-described exception signal 9 for output to processor core 1; and a bus switching circuit 52 that switches a bus to which memory bank 11 is to be connected according to mode signal 13. In this embodiment, mode signal 13 changes according to a value stored in mode register 20 that is included in bus switch control portion 51.

Figure 3:
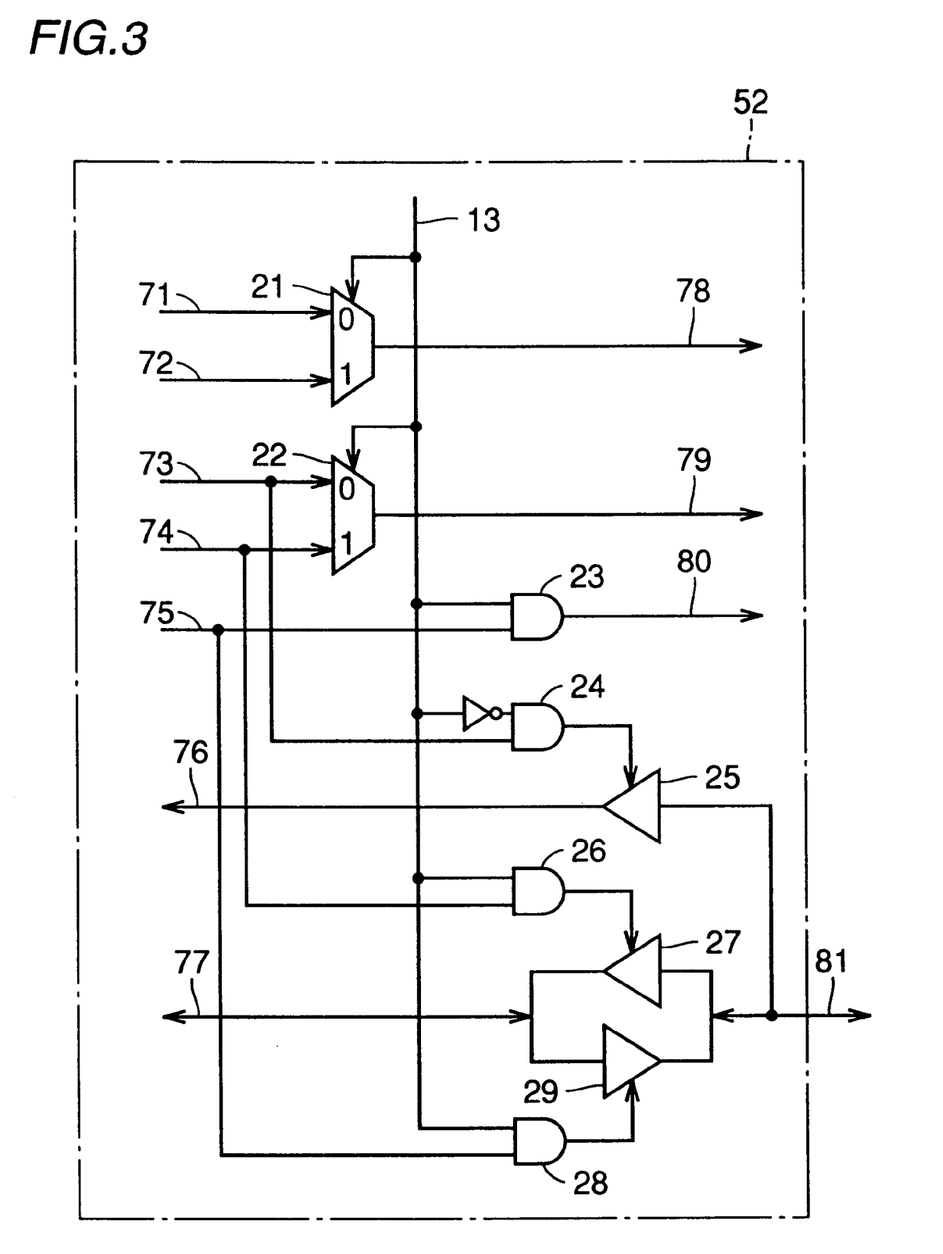
FIG. 3 is a block diagram of a bus switching circuit.

Referring to FIG. 3, bus switching circuit 52 includes: an address selector 21 that has two inputs receiving a command address 71 and a data address 72, and is controlled by mode signal 13 for selecting either one of the addresses to output as a memory address 78; an output control signal selector 22 that has two inputs receiving a command output control signal 73 and a data output control signal 74, and is controlled by mode signal 13 to select either one of the addresses for output as a memory output control signal 79; a write control signal selector 23 formed of an AND gate that has two inputs receiving a data write control signal 75 and mode signal 13, and outputs their logical product as a memory write control signal 80; a command output driver control portion 24 formed of an AND gate that has two inputs receiving an inverted version of mode signal 13 and command output control signal 73; a command output driver 25 that has an input receiving memory data 81, and is controlled by an output of command output driver control portion 24 to output a command to a command signal line 76; a data output driver control portion 26 formed of an AND gate that has two inputs receiving mode signal 13 and data output control signal 74; a data output driver 27 that is controlled by an output of data output driver control portion 26; a data input driver control portion 28 formed of an AND gate that receives mode signal 13 and data write control signal 75; and a data input driver 29 that is controlled by an output of data input driver control portion 28.

The input of data output driver 27 and the output of data input driver 29 are connected to each other, and further coupled to memory data 81. The output of data output driver 27 and the input of data input driver 29 are connected to each other, and further coupled to the data bus via a data signal line 77.

Figure 4:
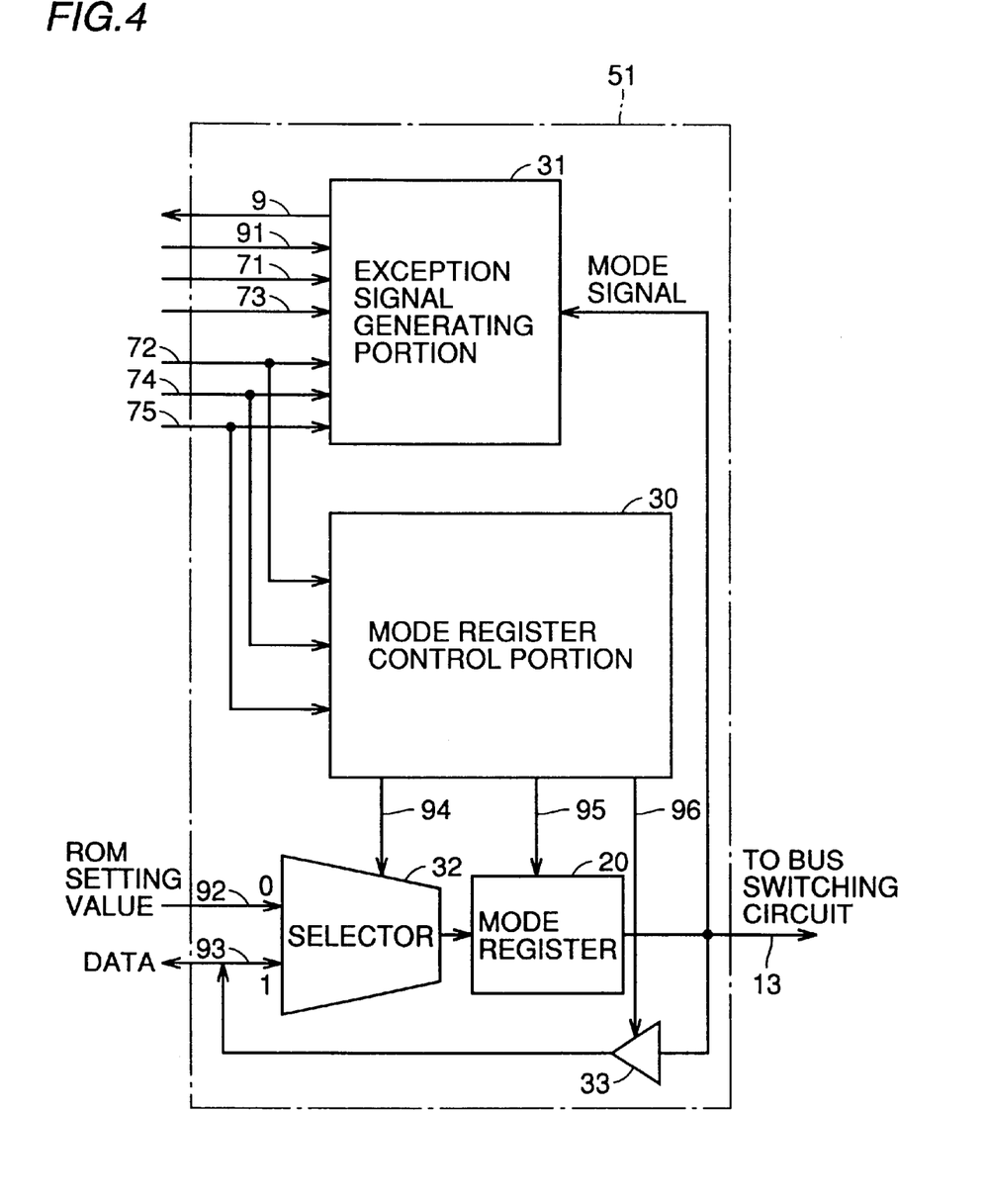
FIG. 4 is a block diagram of a bus switch control portion 51.

Referring to FIG. 4, bus switch control portion 51 includes: an exception signal generating portion 31 that receives a reset signal 91, a command address 71, a command output control signal 73, a data address 72, a data output control signal 74, a data write control signal 75 and mode signal 13 output from this bus switch control portion 51, and outputs exception signal 9 applied to processor core 1 when it detects an access from a respective resource to a bank not allocated thereto; a mode register control portion 30 that receives data address 72, data output control signal 74 and data write control signal 75, and outputs selector control signal 94, mode register write control signal 95 and mode register output control signal 96; a selector 32 that has two inputs receiving a Read Only Memory (ROM) setting value 92 being an initial value of mode register 20 supplied from a ROM (not shown) and data on data signal line 93, and is controlled by selector control signal 94; a mode register 20 that receives an output of selector 32, and is controlled by mode register write control signal 95 to hold the output of selector 32 and output it as mode signal 13; and a mode register output driver 33 that has an input receiving mode signal 13, and is controlled by mode register output control signal 96 to output mode signal 13 onto data signal line 93.

Selector 32 selects ROM setting value 92 when selector control signal 94 is zero (0), and selects a value on data signal line 93 when selector control signal 94 is one (1).

Figure 5:
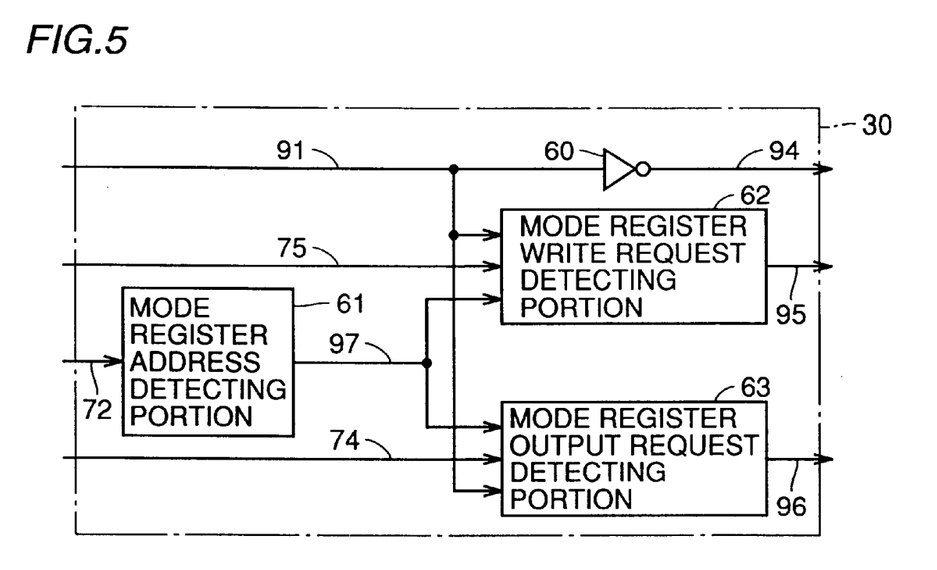
FIG. 5 is a block diagram of a mode register control portion 30.

Referring to FIG. 5, mode register control portion 30 shown in FIG. 4 includes: a selector control signal generating portion 60 formed of an inverter circuit that receives reset signal 91 and inverts the same to output as selector control signal 94; a mode register address detecting portion 61 that receives data address 72, and outputs a mode register address detecting signal 97 when it detects matching of the received data address 72 and an address allocated to mode register 20; a mode register write request detecting portion 62 that receives reset signal 91, data write control signal 75 and mode register address detecting signal 97, and outputs a mode register write control signal 95 that determines a timing of writing to mode register 20; and a mode register output request detecting portion 63 that receives reset signal 91, mode register address detecting signal 97 and data output control signal 74, and outputs a mode register output control signal 96 that causes an output of mode register 20 to be output onto data signal line 93.

Figure 6:
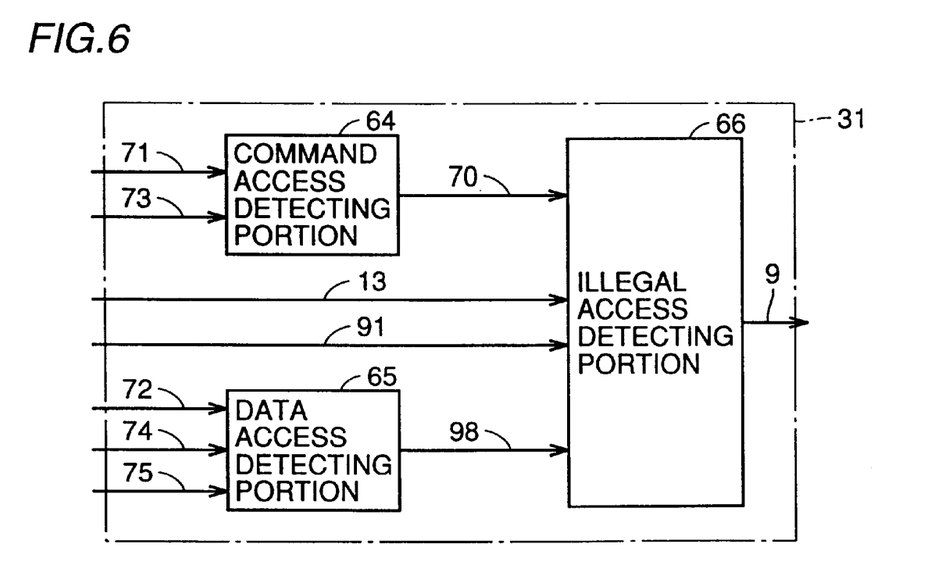
FIG. 6 is a block diagram of an exception signal generating portion 31.

Referring to FIG. 6, exception signal generating portion 31 shown in FIG. 4 includes: a command access detecting portion 64 that receives command address 71 and command output control signal 73, and outputs a command access request signal 70 when it detects a command access request; a data access detecting portion 65 that receives data address 72, data output control signal 74 and data write control signal 75, and outputs a data access request signal 98 when it detects a data access request; and an illegal access detecting portion 66 that receives command access request signal 70, mode signal 13, reset signal 91 and data access request signal 98, and outputs exception signal 9 when it detects an access request (illegal access) from a resource to a bank that is not allocated to the resource.

Referring to FIGS. 1 to 6, processor P0 according to the first embodiment operates as follows.

In a reset operation, selector control signal generating portion 60 shown in FIG. 5 inverts reset signal 91 and sends the inverted signal as selector control signal 94 to selector 32 shown in FIG. 4. As selector control signal 94 is deasserted, selector 32 selects ROM setting value 92 for application to mode register 20. This ROM setting value has been selected as an initial value to be set to each mode register 20, according to a predetermined connection between banks and buses.

Mode register write request detecting portion 62 shown in FIG. 5 responds to assertion of reset signal 91 by asserting mode register write control signal 95. Mode register 20 shown in FIG. 4 holds the output of selector 32 in response to the assertion of mode register write control signal 95. Through such a series of operations, the initial setting value for mode register 20 set in the ROM is written into each mode register 20 during the reset operation of microprocessor P0.

Referring to FIG. 2, bus switching circuit 52 of each bus switch 12 selectively couples a corresponding memory bank 11 to command bus 7 or data bus 8 according to the value of mode signal 13 output from mode register 20. In this manner, mode register 20 is initialized, and allocation of respective banks 11 to command bus 7 and data bus 8 is determined statically.

Referring to FIG. 6, command access detecting portion 64 asserts command access request signal 70 when command address 71 matches the address of corresponding bank 11 and command output control signal 73 is asserted. Likewise, data access detecting portion 65 asserts data access request signal 98 when data address 72 matches the address of corresponding bank 11 and data output control signal 74 or data write control signal 75 is asserted. Illegal access detecting portion 66 asserts exception signal 9 at a timing when a normal access is completed, in the case where the reset signal is asserted and the mode signal is deasserted (i.e., command memory mode) and data access request signal 98 is asserted, or in the case where the reset signal is asserted and mode signal 13 is asserted (i.e., data memory mode) and command access request signal 70 is asserted. Otherwise, exception signal 9 is in a deasserted state.

Thus, in the case where mode signal 13 is deasserted (i.e., the setting value of mode register 20 is zero), exception signal 9 is generated and sent to processor core 1 when there occurs a data access request. This means that a data access to a corresponding memory bank 11 has occurred on data bus 8 although the bank is allocated to command bus 7. As this is thought to be an illegal access, exception signal 9 is given to processor core 1. Processor core 1 performs prescribed exception handling in response to the assertion of exception signal 9.

Referring to FIG. 3, with mode signal 13 being deasserted, address selector 21 selects command address 71 for output as memory address 78. Likewise, output control signal selector 22 selects command output control signal 73 for output as memory output control signal 79. The memory write control signal output from write control signal selector 23 is deasserted. Command output driver control portion 24 outputs command output control signal 73 as it is, and in response thereto, command output driver 25 amplifies memory data 81 and outputs command data via command signal line 76 onto command bus 7. The outputs of data output driver control portion 26 and data input driver control portion 28 are both deasserted, causing neither data output driver 27 nor data input driver 29 to operate.

Next, the operation of bus switch 12 in the case where the value set at mode register 20 is one (1) (i.e., data memory mode) will be described. Referring to FIG. 3, with mode signal 13 being asserted, address selector 21 selects data address 72 for output as memory address 78. Output control signal selector 22 selects data output control signal 74 for output as memory output control signal 79. Write control signal selector 23 outputs data write control signal 75 as it is as memory write control signal 80. Since the output of command output driver control portion 24 is deasserted, corresponding command output driver 25 does not operate. Data output driver control portion 26 and data input driver control portion 28 send data output control signal 74 and data write control signal 75 as they are to data output driver 27 and data input driver 29, respectively.

In the case of data output, data output control signal 74 is asserted, and therefore, data output driver 27 operates to amplify memory data 81 read out from a memory bank for output via data signal line 77 onto data bus 8. In the case of data input, data write control signal 75 is asserted, and data input driver 29 operates to amplify data on data signal line 77 for application as memory data 81 to a memory. Thus, data writing into the memory is performed.

Here, assuming that there occurs an access (command access) to memory bank 11 from a resource other than the one set at mode register 20, command access request signal 70 is asserted by command access detecting portion 64. If reset signal 91 is deasserted and if mode signal 13 is asserted (i.e., data memory mode) and if command access request signal 70 is asserted, illegal access detecting portion 66 (see FIG. 6) asserts exception signal 9 at a timing when a normal access is completed, as described above. Receiving this exception signal 9, processor core 1 performs exception handling to address the illegal access.

Note that mode register 20 is written with a value not only in the reset operation. Even thereafter, the content of mode register 20 can be rewritten occasionally by a program performed at processor core 1.

Processor core 1 is able to perform, as interrupt handling, temporary rewriting of mode register 20 and access to memory bank 11. Writing and reading to and from register 20 are performed as follows.

When processor core 1 designates data address 72 as an address of mode register 20 and asserts data write control signal 75, then mode register control portion 30 asserts selector control signal 94 (see FIG. 5), and asserts mode register write control signal 95. Thus, selector 32 shown in FIG. 4 selects data on data signal line 93 for application to mode register 20. Mode register 20 holds the value in response to the assertion of mode register write control signal 95. Data writing to mode register 20 is thus carried out. As explained above, external data can readily be written into mode register 20, which enables simple bank allocation.

It is also possible to read out the value of mode register 20. In this case, processor core 1 designates data address 72 as the address of mode register 20, and asserts data output control signal 74. Mode register output request detecting portion 63 shown in FIG. 5 asserts mode register output control signal 96. In response to the assertion of mode register output control signal 96, mode register output driver 33 shown in FIG. 4 amplifies mode signal 13 output from mode register 20 and outputs the amplified signal onto data signal line 93. Thus, data reading out of mode register 20 is performed. It is possible to verify the content stored in mode register 20 during the exception handling performed within processor core 1.

As described above, all of or a portion of the single port memory of a fixed capacity contained in microprocessor P0 is used as command/data memory 5, which is divided into a plurality of memory banks 11. It is possible to selectively couple each of memory banks 11 to command bus 7 or data bus 8, depending on the content in mode register 20 of each bus switch 12. In the embodiment shown in FIG. 1, command bus 7 is connected with command switch control unit 2, and data bus 8 is connected with data access control unit 3. Therefore, a bank coupled to command bus 7 can be used by command fetch control unit 2, while a bank connected to data bus 8 can be used by data access control unit 3.

Such a static allocation of a respective memory bank 11 to command fetch control unit 2 or data access control unit 3 enables command access and data access to be performed in parallel with no wait, and also allows the size of memory capacity allocated to each resource to be changed with the size of memory bank as a unit. Therefore, when a memory capacity needed varies for each application, for example, it is possible to readily allocate an optimal memory capacity using a single processor P0, without having to change the hardware.

Furthermore, when there is an access to a bank from a resource other than the one allocated to the relevant bank, exception signal 9 is generated and applied to processor core 1. The illegal access can be handled with software, by the exception handling program performed at processor core 1. Thus, hardware necessary for access arbitration can be reduced, and therefore, it is possible to perform the access arbitration of memory without having to add excessive hardware.

In the device according to the above-described embodiment, command memory 4 and data memory 6 are provided in addition to command/data memory 5. However, the present invention is not limited thereto. It is possible to eliminate either command memory 4 or data memory 6 and to implement the command memory or the data memory with command/data memory 5 only. It is also possible to remove both command memory 4 and data memory 6, and to use all the memory as command/data memory 5.

The embodiment shown in FIG. 1 allows two buses (command bus 7 and data bus 8) to be selectively coupled to the banks. However, the present invention is not limited thereto. It is also possible to have a configuration in which one of three or more buses is selected and coupled to a respective bank. For this purpose, the selector control signal shown in FIG. 4 and mode signal 13 output from mode register 20 only need to have two or more bits.

In the device according to the present embodiment, one bus is connected with only one resource (i.e., command fetch control unit 2 or data access control unit 3). Not limited thereto, however, it is also possible to connect a plurality of resources to one bus.

In the embodiment described above, the mode signal is controlled by the information set within mode register 20. However, the present invention is not limited thereto. For example, it is possible to use a common storage element, such as an EEPROM (Electrically Erasable ROM), instead of mode register 20. Alternatively, it is also possible to directly introduce mode signal 13 from an external terminal, not via such a storage element. This simplifies switching of a memory bank from the outside. It is still possible to eliminate mode register 20 within bus switch 12. A register or a RAM directly accessible from processor core 1 may be used to accomplish the same function as that of mode register 20.

Figure 7:
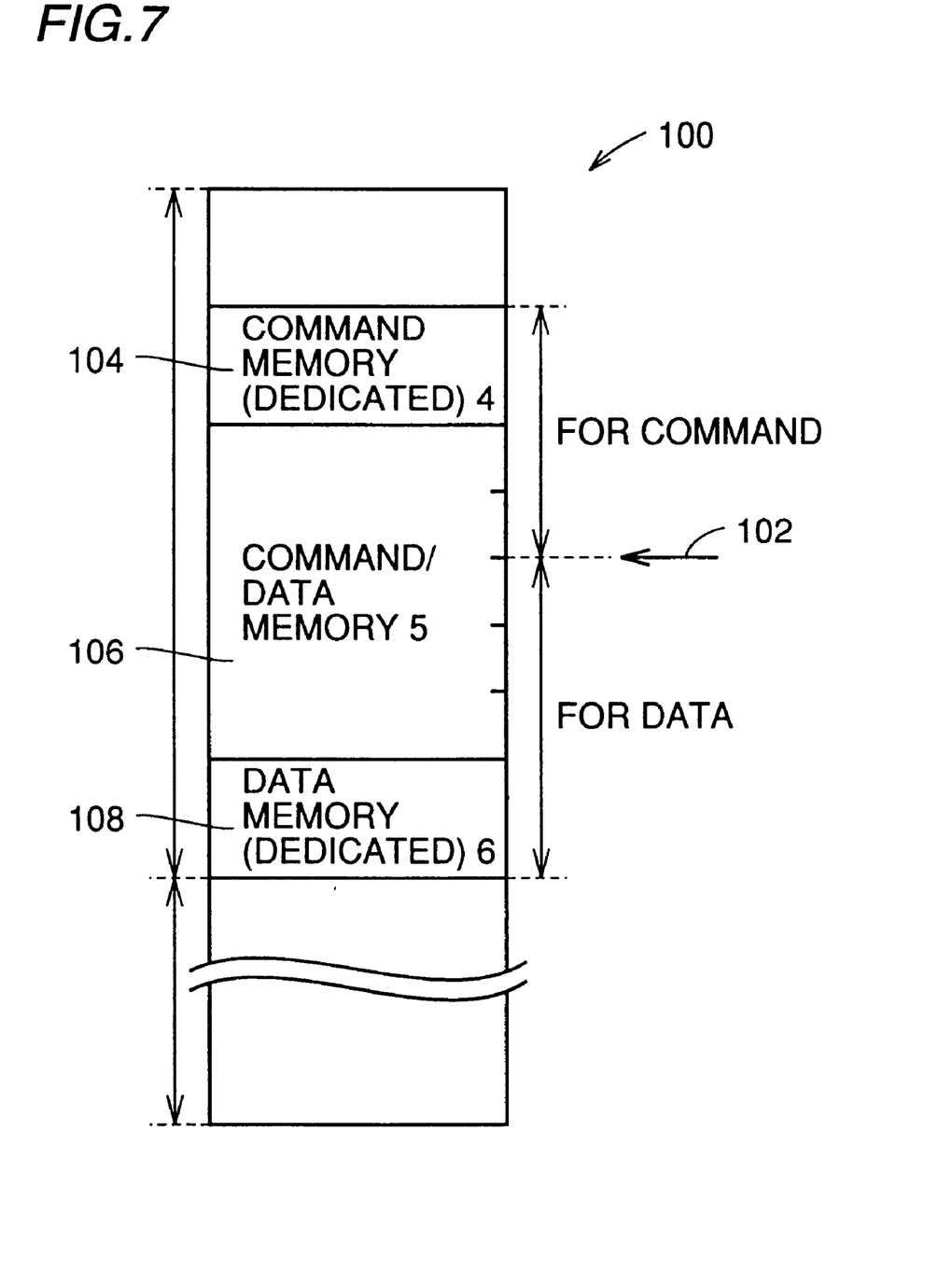
FIG. 7 is a diagram showing an example of a memory map according to the first embodiment.

FIG. 7 shows a memory map 100 that can be implemented in the first embodiment described above. In this embodiment, command memory 4, command/data memory 5 and data memory 6 are mapped to a region 104, a region 106, and a region 108, respectively. Of command/data memory 5, the portion lower than a boundary 102 is allocated for data, and upper portion thereof is allocated for command. Here, the boundary 102 is movable up and down by changing the number of banks to be allocated to each bus.

In the memory mapping shown in FIG. 7, command and data are mapped to continuous regions. Such a mapping is considered to be most realistic and practically worthy. However, the bank allocation method is not limited to the example shown in FIG. 7.

Figure 8:
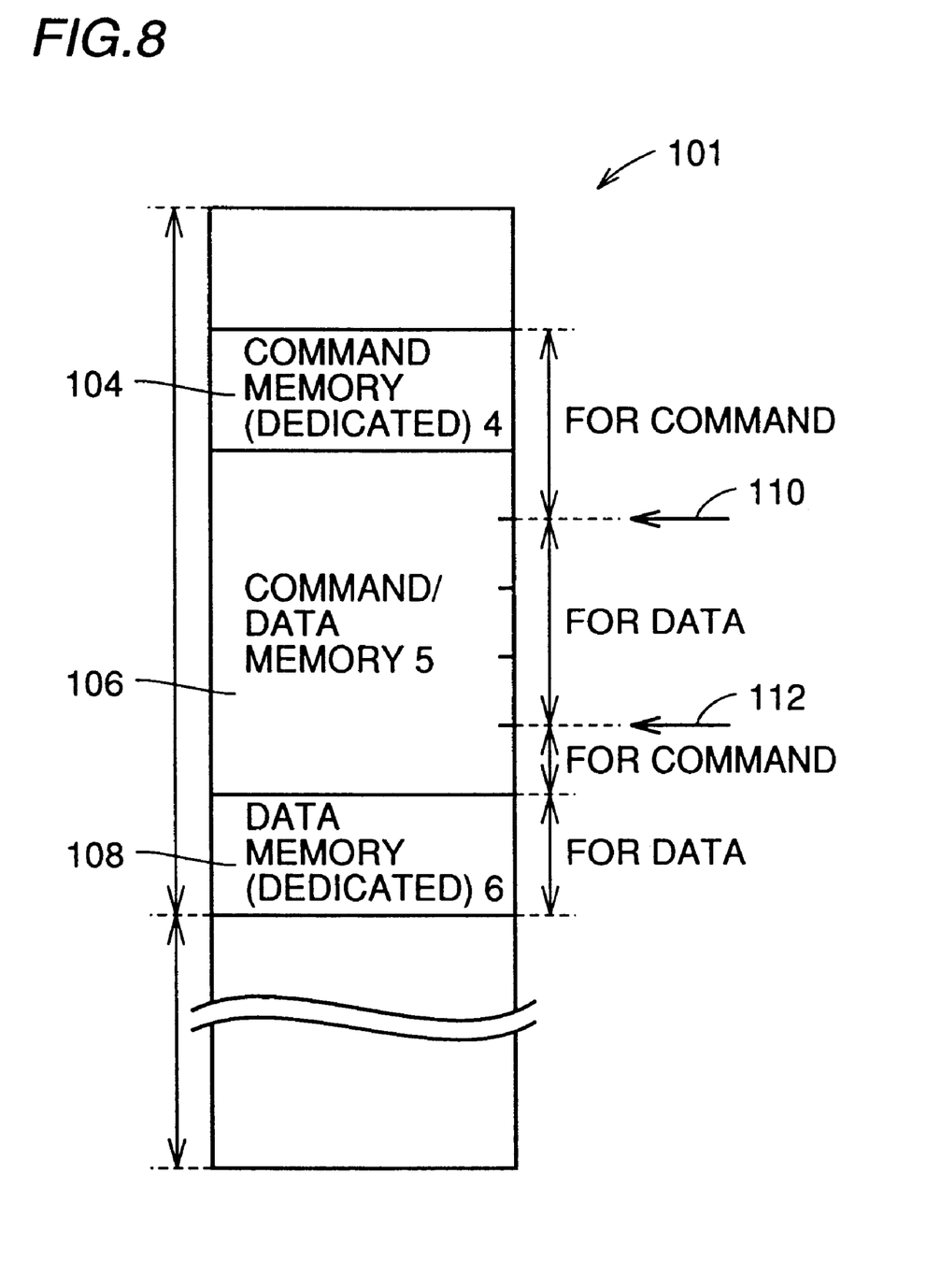
FIG. 8 is a diagram showing another example of the memory map.

For example, in a memory map 101 shown in FIG. 8, the region 106 for command/data memory 5 is divided into three regions by boundaries 110 and 112. Of these regions, the region between boundaries 112 and 110 is allocated for data, and the other regions are allocated for command. Such a memory mapping can also be implemented.

Second Embodiment

Now, a configuration of a microprocessor according to the second embodiment of the present invention will be described. The schematic configuration of the microprocessor of the second embodiment is similar to that of the first embodiment shown in FIG. 1. Thus, the following explanation is for the portions that are different from those in the first embodiment, and the detailed description of the same portions will not be repeated here.

Figure 9:
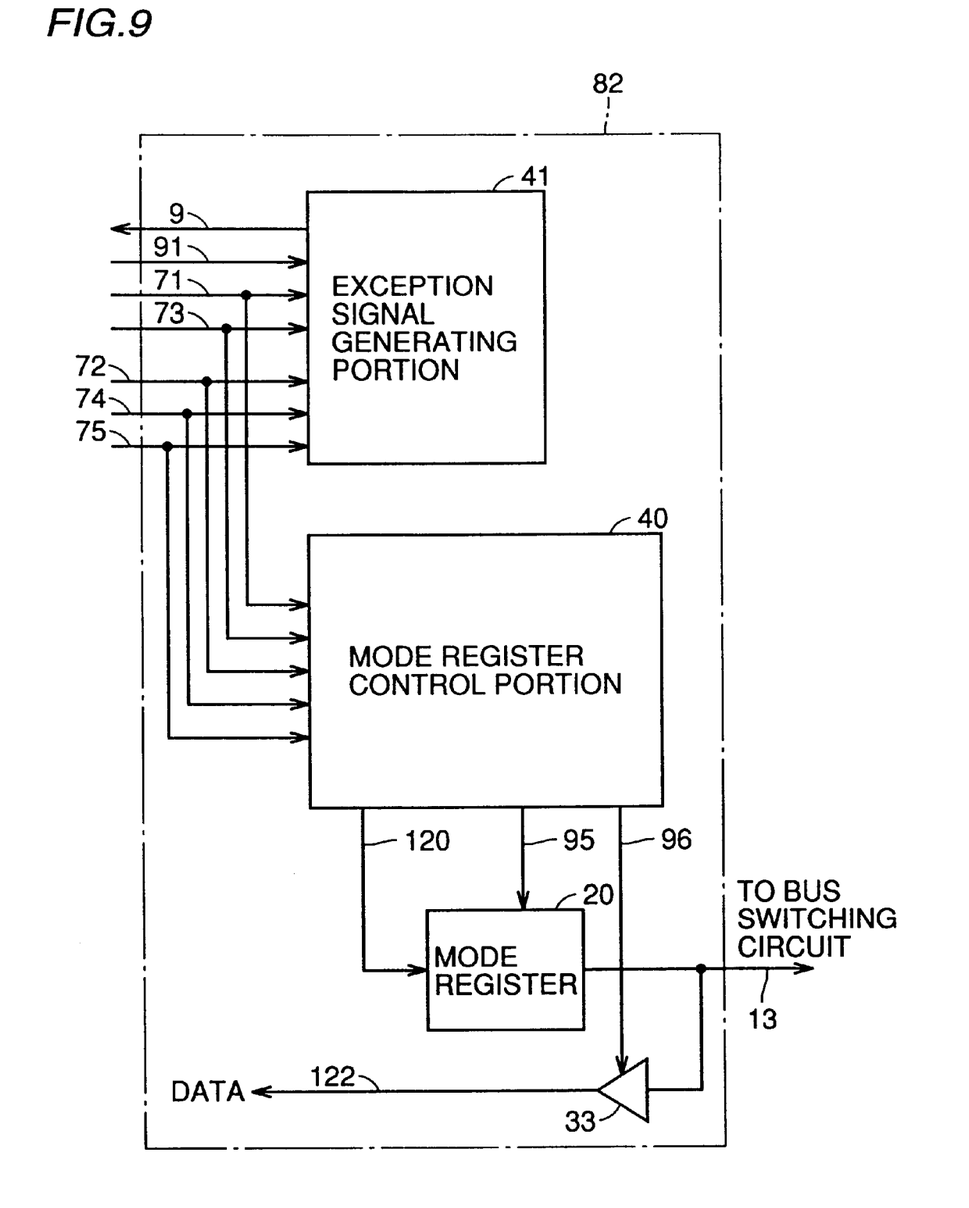
FIG. 9 is a block diagram of a bus switch control portion 82 of a microprocessor according to a second embodiment.

FIG. 9 is a block diagram of a bus switch control portion 82 according to the second embodiment. This bus switch control portion 82 can be used instead of bus switch control portion 51 of the first embodiment. Bus switch control portion 82 shown in FIG. 9 is different from bus switch control portion 51 shown in FIG. 4 in that ROM setting value 92 is not externally supplied thereto.

Referring to FIG. 9, bus switch control portion 82 includes: an exception signal generating portion 41 that receives reset signal 91, command address 71, command output control signal 73, data address 72, data output control signal 74, and data write control signal 75, and generates exception signal 9 for application to processor core 1 when there occur access requests to corresponding memory bank 11 on command bus 7 and data bus 8 simultaneously; a mode register control portion 40 that receives command address 71, command output control signal 73, data address 72, data output control signal 74 and data write control signal 75, and rewrites the value of mode register 20 such that the bus in which the access request has occurred is coupled to the corresponding memory bank based on activities on command bus 7 and data bus 8; and a mode register output driver 33 that is controlled by mode register output control signal 96 output from mode register control portion 40 to output mode signal 13 output from mode register 20 onto data bus 8 via data signal line 122.

Figure 10:
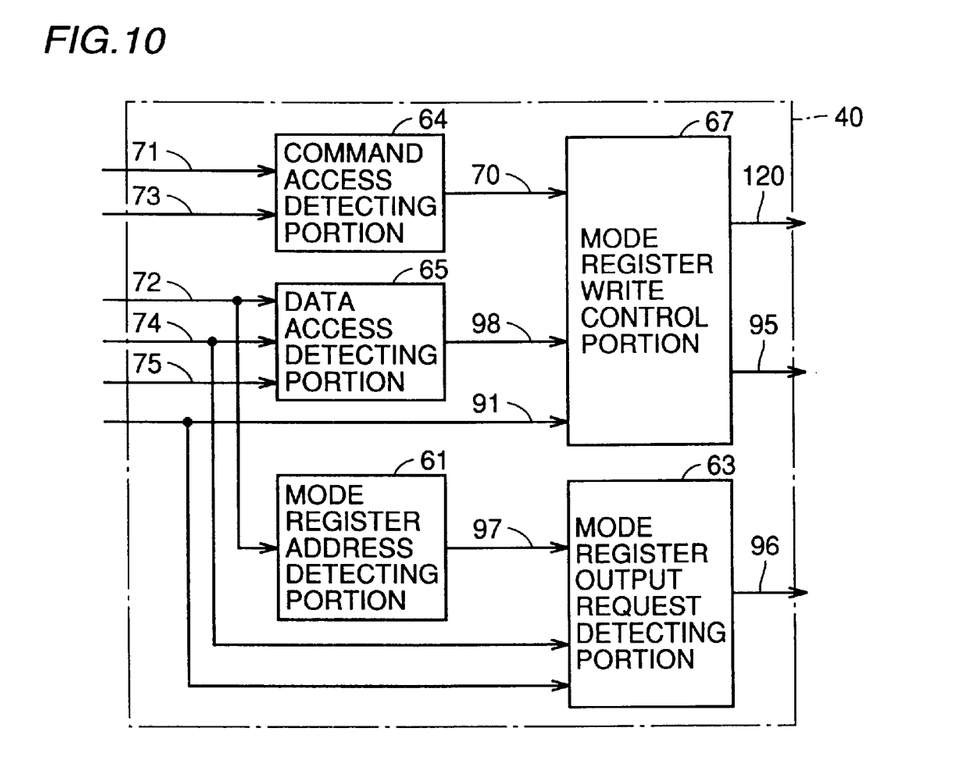
FIG. 10 is a block diagram of a mode register control portion 40.

Referring to FIG. 10, mode register control portion 40 includes: a command access detecting portion 64 that receives command address 71 and command output control signal 73, and asserts command access request signal 70 when command address 71 matches the address of memory bank 11 and command output control signal 73 is asserted; a data access detecting portion 65 that receives data address 72, data output control signal 74 and data write control signal 75, and asserts data access request signal 98 when data address 72 matches the address of memory bank 11 and either data output control signal 74 or data write control signal 75 is asserted; a mode register address detecting portion 61 that receives data address 72 and asserts mode register address detecting signal 97 when data address 72 matches the address of mode register 20; a mode register write control portion 67 that receives command access request signal 70, data access request signal 98 and reset signal 91, and outputs a value to be set at the mode register (mode register setting value) 120 and mode register write control signal 95; and a mode register output request detecting portion 63 that receives mode register address detecting signal 97, data output control signal 74 and reset signal 91, and outputs mode register output control signal 96.

Mode register write control portion 67 sets mode register setting value 120 to a default value (for example, one (1)) and asserts the mode register write control signal when the reset signal is asserted. In the case where the reset signal is deasserted, mode register write control portion 67 asserts mode register write control signal 95 if only one of command access request signal 70 and data access request signal 98 is asserted. At this time, if command access request signal 70 is asserted, mode register setting value is set to zero; if data access request signal 98 is asserted, mode register setting value 120 is set to one. Otherwise, mode register write control portion 67 deasserts mode register write control signal 95 and holds, as mode register setting value 120, the value previously set.

Mode register output request detecting portion 63 is the same as that shown in FIG. 5. Therefore, the detailed description is not repeated.

Figure 11:
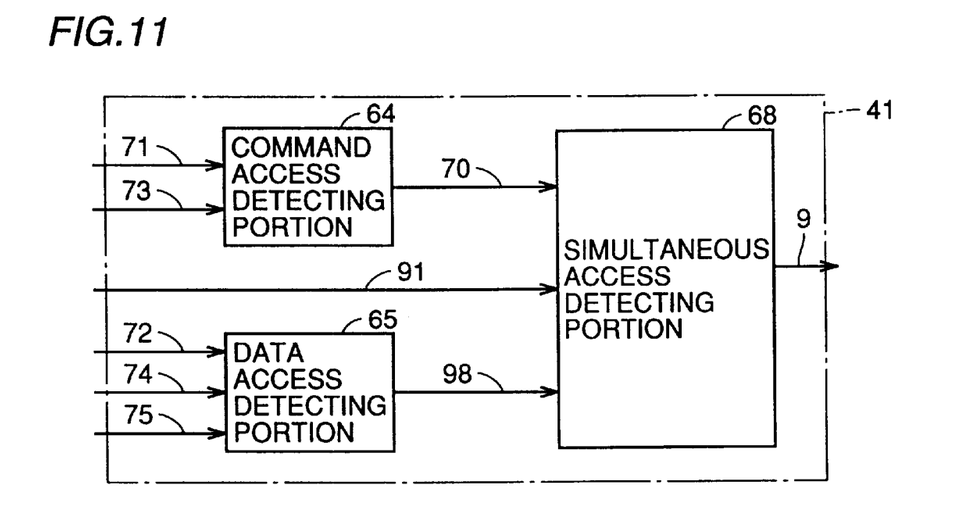
FIG. 11 is a block diagram of an exception signal generating portion 41.

Referring to FIG. 11, exception signal generating portion 41 shown in FIG. 9 includes: a command access detecting portion 64 that receives command address 71 and command output control signal 73, and asserts command access request signal 70 when command address 71 matches the address of memory bank 11 and command output control signal 73 is asserted; a data access detecting portion 65 that receives data address 72, data output control signal 74 and data write control signal 75, and asserts data access request signal 98 when data address 72 matches the address of memory bank 11 and either one of data output control signal 74 and data write control signal 75 is asserted; and a simultaneous access detecting portion 68 that receives command access request signal 70, reset signal 91 and data access request signal 98, and asserts exception signal 9 when detecting simultaneous accesses.

When reset signal 91 is zero and command access request signal 70 is asserted, and data access request signal 98 is also asserted, then simultaneous access detecting portion 68 asserts exception signal 9 at a timing when a normal access is completed. Otherwise, simultaneous access detecting portion 68 deasserts exception signal 9. As a result, in the case where there occur access requests to a same memory bank on command bus 7 and data bus 8 simultaneously, exception signal 9 is asserted; otherwise, exception signal 9 is deasserted.

The processor according to the second embodiment is different from that of the first embodiment in that the value to be set at mode register 20 is determined by the activities on command bus 7 and data bus 8 (specifically, address values and control signals delivered thereon). If command output control signal 73 is asserted when the command address on command bus 7 is equal to the address of memory bank 11, command access detecting portion 64 (see FIG. 10) asserts command access request signal 70. Mode register write control portion 67 sets mode register setting value 120 to "0" (i.e., command memory mode), and asserts mode register write control signal 95. Thus, the value "0" is written into mode register 20 shown in FIG. 9 as mode register setting value 120. Accordingly, as in the first embodiment, the corresponding memory bank 11 is thence coupled to command bus 7, and a resource which first generates a command access request (specifically, command fetch control unit 2 shown in FIG. 1) is allowed to access the relevant memory bank.

In the case where data address 72 is equal to the address of memory bank 11, data access detecting portion 65 shown in FIG. 10 asserts data access request signal 98 when data output control signal 74 or data write control signal 75 is asserted. Mode register write control portion 67 sets mode register setting value 120 to "1" (=data memory mode), and asserts mode register write control signal 95. Thus, the value "1" of mode register setting value 120 is written into mode register 20 shown in FIG. 9, and memory bank 11 is coupled to data bus 8. Thereafter, a resource on data bus 8 is allowed to access this memory bank.

With such a configuration, there may occur access requests to a same memory bank on command bus 7 and data bus 8 simultaneously. In this case, both command access request signal 70 and data access request signal 98 shown in FIG. 10 are asserted, and a mode register setting write control signal is deasserted, and thus, the access is performed with the previous value held at mode register 20. An exception signal generating portion 41 shown in FIG. 11 is provided to solve such access contention. In exception signal generating portion 41, as in the case of FIG. 10, command access request signal 70 and data access request signal 98 are asserted simultaneously. Simultaneous access detecting portion 68, however, asserts exception signal 9 when command access request signal 70 and data access request signal 98 are asserted simultaneously, and sends the signal 9 to processor core 1. Processor core 1 can detect the occurrence of the access contention by receiving this exception signal 9, and can solve the access contention by exception handling.

Note that, in the device according to the present embodiment, the value set at mode register 20 can be read out in the same manner as in the first embodiment. However, it will be easily understood that data cannot be written into mode register 20.

As described above, a portion of the memory contained in the microprocessor can be used as command/data memory 5, and shared memory bank 11 can be dynamically allocated to each resource dependent on the mode setting of bus switch 12. Therefore, it is possible to obtain, using a single port memory, a microprocessor in which command access and data access can be performed in parallel with no wait, and for which a memory capacity ratio can be changed. In the device according to the second embodiment, the bank allocation to resources is dynamically determined corresponding to the activities on respective buses. Thus, different from the first embodiment, it is possible to set the memory capacity ratio regardless of bank boundaries.

Further, in the device according to the second embodiment, the contention of command access and data access to a same memory bank 11 can be solved using software, by exception handling with exception signal 9. Therefore, it is possible to reduce hardware necessary for access arbitration, and to arbitrate the access contention without adding excessive hardware.

Moreover, in the case of the first embodiment, it is necessary to set the value of mode register 20 by a program, and thus, it is necessary to keep in mind the value of mode register 20 when programming. In the device according to the second embodiment, however, mode register control portion 40 sets the value of mode register 20 appropriately. Therefore, it is unnecessary to check the value stored in mode register 20 when programming, which leads to easier program development.

In the device according to the second embodiment, as in the first embodiment, it is possible to use, for example, the entire memory contained in the microprocessor as command/data memory 5 to remove either or both of command memory 4 and data memory 6. It is also possible to allow a combination of a plurality of resources to access a memory. One way to do so is to have three or more buses, and to dynamically couple one of them to a memory bank by bus switch 12. Connecting a plurality of resources to each bus also enables the plurality of resources to access each memory bank.

Still further, both in the first and second embodiments, it is possible to provide a plurality of command/data memories 5 and to allow a specific combination of resources to share each command/data memory 5. For example, it is possible to configure such that resources A and B share a first command/data memory, and resources B and C share another command/data memory.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microprocessor, comprising:
 a first bus and a second bus capable of operating simultaneously;
 a memory divided into a plurality of banks;
 a bus switch circuit provided between said plurality of banks and said first and said second buses; and
 a processor core connected to said first bus, said second bus and said memory,
 wherein each of said plurality of buys switches is provided between corresponding one of said plurality of banks and said first and said second buses, and controlled by bus designating information given to said corresponding bank; and
 wherein each of said plurality of bus switches includes an exception signal generating portion for generating, when detecting occurrence of an access to a corresponding bank on a bus other than the bus coupled to the corresponding bank, an exception for application to said processor core.

2. The microprocessor according to claim 1, wherein each of said plurality of bus switches further includes
 a bus switching circuit for selectively switching an input/output path of a corresponding bank to said first bus or said second bus according to corresponding said bus designating information, and
 a bus switch control portion connected to said bus switching circuit, for providing said bus designating information to said bus switching circuit independent of activities on said first bus and said second bus.

3. The microprocessor according to claim 2, wherein said bus switch control portion includes
- a storage element which stores said bus designating information, having an output connected to said bus switching circuit, and
- a data write circuit for writing said bus designating information supplied to said storage element.

4. The microprocessor according to claim 2, wherein said bus switch control portion includes an external pin connected to an input of said bus switching circuit.

5. A microprocessor, comprising:
- a first bus and a second bus capable of operating simultaneously;
- a memory divided into a plurality of banks;
- a bus switch circuit provided between said plurality of banks and said first and said second buses; and
- a processor core connected to said first bus, said second bus and said memory,
- wherein said bus switch circuit includes a plurality of bus switches each provided between corresponding one of said plurality of banks and said first and said second buses, and controlled by bus designating information given to said corresponding bank; and
- wherein each of said plurality of bus switches includes an access request detecting portion for detecting an access request on said first bus or on said second bus, and coupling the bus with the access request to the input/output path of the corresponding bank.

6. The microprocessor according to claim 5, wherein each of said plurality of bus switches further includes a simultaneous access detecting portion for generating, when detecting occurrence of simultaneous access requests to a same bank on said first bus and said second bus, an exception for application to said processor core.

7. A microprocessor, comprising:
- a first bus and a second bus capable of operating simultaneously;
- a memory divided into a plurality of banks;
- a bus switch circuit provided between said plurality of banks and said first and said second buses; and
- a processor core connected to said first bus, said second bus and said memory,
- wherein said bus switch circuit includes a plurality of bus switches each provided between corresponding one of said plurality of banks and said first and said second buses, and controlled by bus designating information given to said corresponding bank; and
- wherein each of said plurality of bus switches includes a simultaneous access detecting portion for generating, when detecting occurrence of simultaneous access requests to a same bank on said first bus and said second bus, an exception for application to said processor core.

* * * * *